US012002104B2

(12) United States Patent
Christensen et al.

(10) Patent No.: US 12,002,104 B2
(45) Date of Patent: *Jun. 4, 2024

(54) DYNAMIC AUTO INSURANCE POLICY QUOTE CREATION BASED ON TRACKED USER DATA

(71) Applicant: STATE FARM MUTUAL AUTOMOBILE INSURANCE COMPANY, Bloomington, IL (US)

(72) Inventors: Scott T. Christensen, Salem, OR (US); Gregory Hayward, Bloomington, IL (US); Christopher E. Gay, Dallas, TX (US); Steven Cielocha, Bloomington, IL (US); Todd Binion, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,829

(22) Filed: Mar. 23, 2022

(65) Prior Publication Data

US 2022/0215479 A1      Jul. 7, 2022

Related U.S. Application Data

(63) Continuation of application No. 15/966,070, filed on Apr. 30, 2018, now Pat. No. 11,315,189, which is a
(Continued)

(51) Int. Cl.
*G06Q 40/08* (2012.01)
*B60C 1/00* (2006.01)
(Continued)

(52) U.S. Cl.
CPC ............... *G06Q 40/08* (2013.01); *B60C 1/00* (2013.01); *B60Q 1/00* (2013.01); *B60R 25/20* (2013.01);
(Continued)

(58) Field of Classification Search
CPC .......... G06Q 40/08; G06Q 40/00; G07C 5/00; G07C 5/008
See application file for complete search history.

(56) References Cited

U.S. PATENT DOCUMENTS

| 4,303,904 A | 12/1981 | Chasek |
| 5,310,999 A | 5/1994 | Claus et al. |

(Continued)

FOREIGN PATENT DOCUMENTS

| EP | 3239686 A1 | 11/2017 |
| EP | 3578433 B1 | 8/2020 |

(Continued)

OTHER PUBLICATIONS

D. Yoon, J. Choi, H. Kim and J. Kim, "Future Automotive Insurance System based on Telematics Technology," 2008 10th International Conference on Advanced Communication Technology, Gangwon, Korea (South), 2008, pp. 679-681, doi: 10.1109/ICACT.2008. 4493851. (Year: 2008).*

(Continued)

*Primary Examiner* — Elda G Milef
(74) *Attorney, Agent, or Firm* — MARSHALL, GERSTEIN & BORUN LLP (57) ABSTRACT

Computer-implemented methods, servers, and tangible, non-transitory computer-readable media storing instructions for creating one or more new insurance policy quotes for a customer associated with a customer vehicle may be may be described. The computer-implemented methods, servers, and instructions may include receiving a coverage type for
(Continued)

the customer vehicle, causing usage data corresponding to the coverage type to be tracked, receiving the usage data, generating the new insurance policy quotes corresponding to the coverage type based upon at least the usage data, and causing the new insurance policy quotes to be displayed.

20 Claims, 6 Drawing Sheets

Related U.S. Application Data continuation of application No. 14/795,369, filed on Jul. 9, 2015, now Pat. No. 10,013,719, which is a continuation of application No. 14/203,338, filed on Mar. 10, 2014, now Pat. No. 9,141,996.

(60) Provisional application No. 61/775,652, filed on Mar. 10, 2013.

(51) Int. Cl.
| | | |
|---|---|---|
| *B60Q 1/00* | (2006.01) | |
| *B60R 25/20* | (2013.01) | |
| *G06Q 10/0635* | (2023.01) | |
| *G06Q 30/0207* | (2023.01) | |
| *G06Q 30/0208* | (2023.01) | |
| *G06Q 40/00* | (2023.01) | |
| *G07C 5/00* | (2006.01) | |
| *G08G 1/0968* | (2006.01) | |
| *H04W 4/40* | (2018.01) | |

(52) U.S. Cl.
CPC ..... *G06Q 10/0635* (2013.01); *G06Q 30/0207* (2013.01); *G06Q 30/0208* (2013.01); *G06Q 40/00* (2013.01); *G07C 5/00* (2013.01); *G07C 5/008* (2013.01); *G08G 1/096838* (2013.01); *H04W 4/40* (2018.02)

(56) References Cited

U.S. PATENT DOCUMENTS

| | | | |
|---|---|---|---|
| 5,319,611 A | 6/1994 | Korba | |
| 5,499,182 A | 3/1996 | Ousborne | |
| 5,550,551 A | 8/1996 | Alesio | |
| 5,797,134 A | 8/1998 | McMillan et al. | |
| 5,819,230 A | 10/1998 | Christie et al. | |
| 5,916,287 A | 6/1999 | Arjomand et al. | |
| 6,064,970 A | 5/2000 | McMillan et al. | |
| 6,313,791 B1 | 11/2001 | Klanke | |
| 6,408,232 B1 | 6/2002 | Cannon et al. | |
| 6,434,510 B1 | 8/2002 | Callaghan | |
| 6,718,235 B1 | 4/2004 | Borugian | |
| 6,741,168 B2 | 5/2004 | Webb et al. | |
| 6,831,993 B2 | 12/2004 | Lemelson et al. | |
| 6,832,141 B2 * | 12/2004 | Skeen | G07C 5/0808 340/439 |
| 6,856,933 B1 | 2/2005 | Callaghan | |
| 6,868,386 B1 | 3/2005 | Henderson et al. | |
| 6,885,312 B1 | 4/2005 | Kirkpatrick | |
| 7,194,347 B2 | 3/2007 | Harumoto et al. | |
| 7,343,306 B1 | 3/2008 | Bates et al. | |
| 7,343,310 B1 | 3/2008 | Stender | |
| 7,571,128 B1 | 8/2009 | Brown | |
| 7,650,210 B2 | 1/2010 | Breed | |
| 7,659,827 B2 | 2/2010 | Gunderson et al. | |
| 7,692,552 B2 | 4/2010 | Harrington et al. | |
| 7,724,145 B2 | 5/2010 | Batra et al. | |
| 7,725,348 B1 | 5/2010 | Allen et al. | |
| 7,812,712 B2 | 10/2010 | White et al. | |
| 7,860,764 B1 | 12/2010 | Alexander et al. | |
| 7,865,378 B2 | 1/2011 | Gay | |
| 7,870,010 B2 | 1/2011 | Joao | |
| 7,873,455 B2 | 1/2011 | Arshad et al. | |
| 7,890,355 B2 | 2/2011 | Gay et al. | |
| 7,930,098 B2 | 4/2011 | Huang et al. | |
| 7,937,278 B1 | 5/2011 | Cripe et al. | |
| 7,991,629 B2 | 8/2011 | Gay et al. | |
| 8,027,853 B1 | 9/2011 | Kazenas | |
| 8,056,538 B2 | 11/2011 | Harnack et al. | |
| 8,086,523 B1 | 12/2011 | Palmer | |
| 8,090,598 B2 * | 1/2012 | Bauer | G07C 5/008 701/1 |
| 8,140,358 B1 * | 3/2012 | Ling | G07C 5/008 340/439 |
| 8,240,480 B2 | 8/2012 | Shaw et al. | |
| 8,280,752 B1 | 10/2012 | Cripe et al. | |
| 8,311,858 B2 | 11/2012 | Everett et al. | |
| 8,332,242 B1 | 12/2012 | Medina, III | |
| 8,352,118 B1 | 1/2013 | Mittelsteadt et al. | |
| 8,359,213 B2 | 1/2013 | Berg et al. | |
| 8,359,259 B2 | 1/2013 | Berg et al. | |
| 8,407,139 B1 | 3/2013 | Palmer | |
| 8,423,239 B2 | 4/2013 | Blumer et al. | |
| 8,438,048 B1 | 5/2013 | Benavides, III | |
| 8,489,433 B2 | 7/2013 | Altieri et al. | |
| 8,508,353 B2 | 8/2013 | Cook et al. | |
| 8,527,146 B1 | 9/2013 | Jackson et al. | |
| 8,538,785 B2 | 9/2013 | Coleman et al. | |
| 8,538,789 B1 | 9/2013 | Blank et al. | |
| 8,566,126 B1 | 10/2013 | Hopkins, III | |
| 8,569,141 B2 | 10/2013 | Huang et al. | |
| 8,605,948 B2 | 12/2013 | Mathony et al. | |
| 8,606,512 B1 | 12/2013 | Bogovich et al. | |
| 8,606,514 B2 | 12/2013 | Rowley et al. | |
| 8,612,139 B2 | 12/2013 | Wang et al. | |
| 8,630,768 B2 | 1/2014 | McClellan et al. | |
| 8,635,091 B2 | 1/2014 | Amigo et al. | |
| 8,655,544 B2 | 2/2014 | Fletcher et al. | |
| 8,682,699 B2 | 3/2014 | Collins et al. | |
| 8,686,844 B1 | 4/2014 | Wine | |
| 8,725,408 B2 | 5/2014 | Hochkirchen et al. | |
| 8,731,768 B2 | 5/2014 | Fernandes et al. | |
| 8,744,642 B2 | 6/2014 | Nemat-Nasser et al. | |
| 8,781,900 B2 | 7/2014 | Schwarz et al. | |
| 8,799,035 B2 | 8/2014 | Coleman et al. | |
| 8,799,036 B1 | 8/2014 | Christensen et al. | |
| 8,812,330 B1 | 8/2014 | Cripe et al. | |
| 8,874,477 B2 | 10/2014 | Hoffberg | |
| 8,892,451 B2 | 11/2014 | Everett et al. | |
| 8,935,036 B1 | 1/2015 | Christensen et al. | |
| 8,983,677 B2 | 3/2015 | Wright et al. | |
| 8,989,914 B1 | 3/2015 | Nemat-Nasser et al. | |
| 9,008,956 B2 | 4/2015 | Hyde et al. | |
| 9,031,545 B1 | 5/2015 | Srey et al. | |
| 9,053,469 B1 | 6/2015 | Bohanek et al. | |
| 9,098,367 B2 | 8/2015 | Ricci | |
| 9,105,066 B2 | 8/2015 | Gay et al. | |
| 9,141,582 B1 | 9/2015 | Brinkmann et al. | |
| 9,141,995 B1 | 9/2015 | Brinkmann et al. | |
| 9,141,996 B2 | 9/2015 | Christensen et al. | |
| 9,164,957 B2 | 10/2015 | Hassib et al. | |
| 9,183,441 B2 | 11/2015 | Blumer et al. | |
| 9,208,525 B2 | 12/2015 | Hayward et al. | |
| 9,221,428 B2 | 12/2015 | Kote et al. | |
| 9,235,750 B1 | 1/2016 | Sutton et al. | |
| 9,256,991 B2 | 2/2016 | Crawford | |
| 9,311,271 B2 | 4/2016 | Wright | |
| 9,418,383 B1 | 8/2016 | Hayward et al. | |
| 9,454,786 B1 * | 9/2016 | Srey | G06Q 30/0283 |
| 9,633,487 B2 | 4/2017 | Wright | |
| 9,646,347 B1 | 5/2017 | Hayward et al. | |
| 9,665,997 B2 | 5/2017 | Morgan et al. | |
| 9,734,537 B2 | 8/2017 | Christensen et al. | |
| 9,779,458 B2 | 10/2017 | Hayward et al. | |
| 9,830,748 B2 | 11/2017 | Rosenbaum | |
| 9,865,020 B1 | 1/2018 | Hayward et al. | |
| 9,990,782 B2 | 6/2018 | Rosenbaum | |
| 10,013,719 B1 | 7/2018 | Christensen et al. | |
| 10,176,530 B1 | 1/2019 | Hayward et al. | |
| 10,192,369 B2 | 1/2019 | Wright | |
| 10,198,879 B2 | 2/2019 | Wright | |

(56) References Cited

U.S. PATENT DOCUMENTS

| | | |
|---|---|---|
| 10,269,190 B2 | 4/2019 | Rosenbaum |
| 10,373,264 B1 | 8/2019 | Christensen et al. |
| 10,387,967 B1 | 8/2019 | Hayward et al. |
| 10,467,824 B2 | 11/2019 | Rosenbaum |
| 10,719,879 B1 | 7/2020 | Gay et al. |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2001/0044733 A1 | 11/2001 | Lee et al. |
| 2002/0026394 A1 | 2/2002 | Savage et al. |
| 2002/0111725 A1 | 8/2002 | Burge |
| 2002/0128985 A1 | 9/2002 | Greenwald |
| 2002/0198843 A1 | 12/2002 | Wang et al. |
| 2003/0112133 A1 | 6/2003 | Webb et al. |
| 2003/0191581 A1 | 10/2003 | Ukai et al. |
| 2003/0209893 A1 | 11/2003 | Breed et al. |
| 2003/0229528 A1 | 12/2003 | Nitao et al. |
| 2003/0236686 A1 | 12/2003 | Matsumoto et al. |
| 2004/0039611 A1 | 2/2004 | Hong et al. |
| 2004/0102984 A1 | 5/2004 | Wahlbin et al. |
| 2004/0107042 A1 | 6/2004 | Seick |
| 2004/0117358 A1 | 6/2004 | von Kaenel et al. |
| 2004/0153362 A1 | 8/2004 | Bauer et al. |
| 2004/0172304 A1 | 9/2004 | Joao |
| 2004/0193347 A1 | 9/2004 | Harumoto et al. |
| 2004/0225557 A1 | 11/2004 | Phelan et al. |
| 2005/0024185 A1 | 2/2005 | Chuey |
| 2005/0171663 A1 | 8/2005 | Mittelsteadt et al. |
| 2005/0267784 A1 | 12/2005 | Slen et al. |
| 2005/0283388 A1 | 12/2005 | Eberwine et al. |
| 2006/0049925 A1 | 3/2006 | Hara et al. |
| 2006/0053038 A1 | 3/2006 | Warren et al. |
| 2006/0059020 A1 | 3/2006 | Davidson |
| 2006/0075120 A1 | 4/2006 | Smit |
| 2006/0079280 A1 | 4/2006 | LaPerch |
| 2006/0095301 A1 | 5/2006 | Gay |
| 2006/0114531 A1 | 6/2006 | Webb et al. |
| 2006/0206415 A1 | 9/2006 | Ross |
| 2006/0247852 A1 | 11/2006 | Kortge et al. |
| 2007/0005404 A1 | 1/2007 | Raz et al. |
| 2007/0061173 A1 | 3/2007 | Gay |
| 2007/0106539 A1 | 5/2007 | Gay |
| 2007/0124045 A1 | 5/2007 | Ayoub et al. |
| 2007/0156312 A1 | 7/2007 | Breed et al. |
| 2007/0156468 A1 | 7/2007 | Gay et al. |
| 2007/0226014 A1 | 9/2007 | Alemayehu et al. |
| 2007/0256499 A1 | 11/2007 | Pelecanos et al. |
| 2007/0268158 A1 | 11/2007 | Gunderson et al. |
| 2007/0282638 A1 | 12/2007 | Surovy |
| 2007/0288270 A1 | 12/2007 | Gay et al. |
| 2007/0299700 A1 | 12/2007 | Gay et al. |
| 2008/0018466 A1 | 1/2008 | Batra et al. |
| 2008/0027761 A1 | 1/2008 | Bracha |
| 2008/0051996 A1 | 2/2008 | Dunning et al. |
| 2008/0059019 A1 | 3/2008 | Delia et al. |
| 2008/0065427 A1 | 3/2008 | Helitzer et al. |
| 2008/0174451 A1 | 7/2008 | Harrington et al. |
| 2008/0215376 A1 | 9/2008 | Engelman |
| 2008/0243558 A1 | 10/2008 | Gupte |
| 2008/0255888 A1 | 10/2008 | Berkobin et al. |
| 2008/0294690 A1 | 11/2008 | McClellan et al. |
| 2008/0319602 A1 | 12/2008 | McClellan et al. |
| 2009/0002147 A1 | 1/2009 | Bloebaum et al. |
| 2009/0024419 A1 | 1/2009 | McClellan et al. |
| 2009/0024420 A1 | 1/2009 | Winkler |
| 2009/0024458 A1 | 1/2009 | Palmer |
| 2009/0043441 A1 | 2/2009 | Breed |
| 2009/0094066 A1 | 4/2009 | Freudman et al. |
| 2009/0150023 A1 | 6/2009 | Grau et al. |
| 2009/0210257 A1 | 8/2009 | Chalfant et al. |
| 2009/0240575 A1 | 9/2009 | Bettez et al. |
| 2010/0030568 A1 | 2/2010 | Daman |
| 2010/0030586 A1* | 2/2010 | Taylor .................. G06Q 30/02 705/4 |
| 2010/0066513 A1 | 3/2010 | Bauchot et al. |
| 2010/0088123 A1 | 4/2010 | McCall et al. |
| 2010/0131302 A1 | 5/2010 | Collopy et al. |
| 2010/0131304 A1 | 5/2010 | Collopy et al. |
| 2010/0138244 A1 | 6/2010 | Basir |
| 2010/0185534 A1 | 7/2010 | Satyavolu et al. |
| 2010/0223080 A1 | 9/2010 | Basir et al. |
| 2010/0238009 A1 | 9/2010 | Cook et al. |
| 2011/0022421 A1 | 1/2011 | Brown et al. |
| 2011/0040579 A1 | 2/2011 | Havens |
| 2011/0106370 A1 | 5/2011 | Duddle et al. |
| 2011/0112717 A1 | 5/2011 | Resner |
| 2011/0125363 A1 | 5/2011 | Blumer et al. |
| 2011/0137685 A1 | 6/2011 | Tracy et al. |
| 2011/0153367 A1 | 6/2011 | Amigo et al. |
| 2011/0161117 A1 | 6/2011 | Busque et al. |
| 2011/0161118 A1 | 6/2011 | Borden et al. |
| 2011/0195699 A1 | 8/2011 | Tadayon et al. |
| 2011/0200052 A1 | 8/2011 | Mungo et al. |
| 2011/0213628 A1 | 9/2011 | Peak et al. |
| 2011/0267186 A1 | 11/2011 | Rao et al. |
| 2011/0304446 A1 | 12/2011 | Basson et al. |
| 2011/0307188 A1 | 12/2011 | Peng et al. |
| 2012/0004933 A1 | 1/2012 | Foladare et al. |
| 2012/0021386 A1 | 1/2012 | Anderson et al. |
| 2012/0022896 A1 | 1/2012 | Jayaram et al. |
| 2012/0029945 A1 | 2/2012 | Altieri et al. |
| 2012/0065834 A1 | 3/2012 | Senart et al. |
| 2012/0069979 A1 | 3/2012 | Henry, Jr. et al. |
| 2012/0072243 A1 | 3/2012 | Collins et al. |
| 2012/0072244 A1 | 3/2012 | Collins et al. |
| 2012/0089423 A1 | 4/2012 | Tamir et al. |
| 2012/0089701 A1 | 4/2012 | Goel |
| 2012/0101855 A1 | 4/2012 | Collins et al. |
| 2012/0109418 A1 | 5/2012 | Lorber |
| 2012/0109692 A1 | 5/2012 | Collins et al. |
| 2012/0130752 A1 | 5/2012 | Moskal |
| 2012/0158436 A1 | 6/2012 | Bauer et al. |
| 2012/0190386 A1 | 7/2012 | Anderson |
| 2012/0197669 A1 | 8/2012 | Kote et al. |
| 2012/0209632 A1 | 8/2012 | Kaminski et al. |
| 2012/0209634 A1 | 8/2012 | Ling et al. |
| 2012/0214472 A1 | 8/2012 | Tadayon et al. |
| 2012/0226421 A1 | 9/2012 | Kote et al. |
| 2012/0259665 A1 | 10/2012 | Pandhi et al. |
| 2012/0271661 A1 | 10/2012 | Reynolds et al. |
| 2012/0283893 A1 | 11/2012 | Lee et al. |
| 2012/0323531 A1 | 12/2012 | Pascu et al. |
| 2012/0323772 A1 | 12/2012 | Michael |
| 2012/0330499 A1 | 12/2012 | Scheid et al. |
| 2013/0006675 A1 | 1/2013 | Bowne et al. |
| 2013/0013347 A1 | 1/2013 | Ling et al. |
| 2013/0013348 A1 | 1/2013 | Ling et al. |
| 2013/0018677 A1 | 1/2013 | Chevrette |
| 2013/0035964 A1 | 2/2013 | Roscoe et al. |
| 2013/0041521 A1 | 2/2013 | Basir et al. |
| 2013/0041621 A1 | 2/2013 | Smith et al. |
| 2013/0046510 A1 | 2/2013 | Bowne et al. |
| 2013/0046559 A1 | 2/2013 | Coleman et al. |
| 2013/0046562 A1 | 2/2013 | Taylor et al. |
| 2013/0046646 A1 | 2/2013 | Malan |
| 2013/0073114 A1 | 3/2013 | Nemat-Nasser et al. |
| 2013/0084847 A1 | 4/2013 | Tibbitts et al. |
| 2013/0110310 A1 | 5/2013 | Young |
| 2013/0117050 A1 | 5/2013 | Berg et al. |
| 2013/0144474 A1 | 6/2013 | Ricci |
| 2013/0144657 A1 | 6/2013 | Ricci |
| 2013/0151064 A1 | 6/2013 | Becker et al. |
| 2013/0161110 A1 | 6/2013 | Furst |
| 2013/0166098 A1 | 6/2013 | Lavie et al. |
| 2013/0166326 A1 | 6/2013 | Lavie et al. |
| 2013/0188794 A1 | 7/2013 | Kawamata et al. |
| 2013/0189660 A1 | 7/2013 | Mangum et al. |
| 2013/0204645 A1 | 8/2013 | Lehman et al. |
| 2013/0211662 A1 | 8/2013 | Blumer et al. |
| 2013/0218604 A1 | 8/2013 | Hagelstein et al. |
| 2013/0226624 A1 | 8/2013 | Blessman et al. |
| 2013/0244210 A1 | 9/2013 | Nath et al. |
| 2013/0262530 A1 | 10/2013 | Collins et al. |

(56) References Cited

U.S. PATENT DOCUMENTS

| | | |
|---|---|---|
| 2013/0289819 A1 | 10/2013 | Hassib et al. |
| 2013/0297387 A1 | 11/2013 | Michael |
| 2013/0304276 A1 | 11/2013 | Flies |
| 2013/0304515 A1 | 11/2013 | Gryan et al. |
| 2013/0317693 A1 | 11/2013 | Jefferies et al. |
| 2013/0325519 A1 | 12/2013 | Tracy et al. |
| 2013/0344856 A1 | 12/2013 | Silver et al. |
| 2013/0345896 A1 | 12/2013 | Blumer et al. |
| 2014/0012604 A1* | 1/2014 | Allen, Jr. ............... G06Q 40/08 705/4 |
| 2014/0019167 A1 | 1/2014 | Cheng et al. |
| 2014/0019170 A1 | 1/2014 | Coleman et al. |
| 2014/0025401 A1 | 1/2014 | Hagelstein et al. |
| 2014/0046701 A1 | 2/2014 | Steinberg et al. |
| 2014/0052479 A1 | 2/2014 | Kawamura |
| 2014/0058761 A1 | 2/2014 | Freiberger et al. |
| 2014/0074345 A1 | 3/2014 | Gabay et al. |
| 2014/0074402 A1 | 3/2014 | Hassib et al. |
| 2014/0089101 A1 | 3/2014 | Meller |
| 2014/0108058 A1 | 4/2014 | Bourne et al. |
| 2014/0111647 A1 | 4/2014 | Atsmon et al. |
| 2014/0114696 A1 | 4/2014 | Amigo et al. |
| 2014/0180723 A1 | 6/2014 | Cote et al. |
| 2014/0180727 A1 | 6/2014 | Freiberger et al. |
| 2014/0257863 A1 | 9/2014 | Maastricht et al. |
| 2014/0257865 A1 | 9/2014 | Gay et al. |
| 2014/0257866 A1 | 9/2014 | Gay et al. |
| 2014/0257867 A1 | 9/2014 | Gay et al. |
| 2014/0257868 A1 | 9/2014 | Hayward et al. |
| 2014/0257869 A1 | 9/2014 | Binion et al. |
| 2014/0257870 A1 | 9/2014 | Cielocha et al. |
| 2014/0257871 A1 | 9/2014 | Christensen et al. |
| 2014/0257872 A1 | 9/2014 | Christensen et al. |
| 2014/0257873 A1 | 9/2014 | Hayward et al. |
| 2014/0257874 A1 | 9/2014 | Hayward et al. |
| 2014/0278574 A1 | 9/2014 | Barber |
| 2014/0304011 A1 | 10/2014 | Yager et al. |
| 2014/0310028 A1 | 10/2014 | Christensen et al. |
| 2015/0324920 A1 | 11/2015 | Wilson et al. |
| 2016/0086393 A1 | 3/2016 | Collins et al. |
| 2016/0225098 A1 | 8/2016 | Helitzer et al. |
| 2021/0312565 A1 | 10/2021 | Binion et al. |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | | |
|---|---|---|---|
| EP | 3730375 B1 | 10/2021 | |
| EP | 3960576 A1 | 3/2022 | |
| EP | 4190660 A1 | 6/2023 | |
| EP | 4190959 A1 | 6/2023 | |
| WO | WO-2008124805 A2 * | 10/2008 | ............ G06Q 40/08 |
| WO | WO-2012092161 A2 * | 7/2012 | ............ G06Q 30/00 |

OTHER PUBLICATIONS

Berg, "10 Diagnostic Apps and Devices to Make You a Better Driver", Popular Mechanics (Feb. 21, 2012).

Classic Car Feature Article "Insurance by the Mile", Article #102504, by Jack Nerad for Driving Today, downloaded from the Internet at: <http://www.antiquecar.com/feature-insurance_by_the_mile.php> (Oct. 25, 2004).

Knoop et al., Variable insurance premium for safer driving: a survey result, 14th International IEEE Conference on Intelligent Transportation Systems, Washington DC, Oct. 5-7, 2011 (2011).

Mihailescu, An assessment Charter airline benefits for Port Elizabeth and the Eastern Cape, Chinese Business Review, pp. 34-45 (Feb. 2010).

Nerad, "Insurance by the Mile", AntiqueCar.com, Mar. 11, 2007, downloaded from the Internet at: <http://www.antiquecar.com/feature_insurance_by_the_mile.php> (3 pages).

Troncoso et al., PriPAYD: Privacy-Friendly Pay-As-You-Drive Insurance, IEEE Transactions on Dependable and Secure Computing, vol. 8, No. 5, Sep./Oct. 2011.

U.S. Appl. No. 14/202,660, Final Office Action, dated Jul. 10, 2015.
U.S. Appl. No. 14/202,660, Final Office Action, dated Sep. 4, 2014.
U.S. Appl. No. 14/202,660, Nonfinal Office Action, dated Feb. 3, 2015.
U.S. Appl. No. 14/202,660, Nonfinal Office Action, dated Jul. 28, 2017.
U.S. Appl. No. 14/202,660, Nonfinal Office Action, dated May 14, 2014.
U.S. Appl. No. 14/202,812, Final Office Action, dated Jul. 23, 2015.
U.S. Appl. No. 14/202,812, Final Office Action, dated Nov. 1, 2017.
U.S. Appl. No. 14/202,812, Final Office Action, dated Sep. 5, 2014.
U.S. Appl. No. 14/202,812, Nonfinal Office Action, dated Feb. 23, 2015.
U.S. Appl. No. 14/202,812, Nonfinal Office Action, dated Jun. 30, 2017.
U.S. Appl. No. 14/202,812, Nonfinal Office Action, dated May 23, 2014.
U.S. Appl. No. 14/202,997, Notice of Allowance, dated May 29, 2014.
U.S. Appl. No. 14/203,015, Notice of Allowance, dated Mar. 31, 2015.
U.S. Appl. No. 14/203,015, Office Action, dated May 22, 2014.
U.S. Appl. No. 14/203,015, Office Action, dated Oct. 29, 2014.
U.S. Appl. No. 14/203,115, Final Office Action, dated Dec. 12, 2016.
U.S. Appl. No. 14/203,115, Final Office Action, dated Mar. 12, 2015.
U.S. Appl. No. 14/203,115, Final Office Action, dated Nov. 3, 2017.
U.S. Appl. No. 14/203,115, Final Office Action, dated Nov. 5, 2015.
U.S. Appl. No. 14/203,115, Nonfinal Office Action, dated Jun. 11, 2014.
U.S. Appl. No. 14/203,115, Nonfinal Office Action, dated Jun. 15, 2017.
U.S. Appl. No. 14/203,115, Nonfinal Office Action, dated Jun. 28, 2016.
U.S. Appl. No. 14/203,115, Nonfinal Office Action, dated Jun. 30, 2015.
U.S. Appl. No. 14/203,115, Nonfinal Office Action, dated Oct. 9, 2014.
U.S. Appl. No. 14/203,143, Examiner's Answer to Appeal Brief, dated Nov. 17, 2016.
U.S. Appl. No. 14/203,143, Final Office Action, dated Jan. 7, 2016.
U.S. Appl. No. 14/203,143, Final Office Action, dated Jun. 20, 2019.
U.S. Appl. No. 14/203,143, Final Office Action, dated Mar. 23, 2020.
U.S. Appl. No. 14/203,143, Final Office Action, dated May 18, 2015.
U.S. Appl. No. 14/203,143, Final Office Action, dated Oct. 29, 2020.
U.S. Appl. No. 14/203,143, Final Office Action, dated Sep. 23, 2014.
U.S. Appl. No. 14/203,143, Nonfinal Office Action, dated Feb. 7, 2019.
U.S. Appl. No. 14/203,143, Nonfinal Office Action, dated Jan. 14, 2015.
U.S. Appl. No. 14/203,143, Nonfinal Office Action, dated Jul. 29, 2015.
U.S. Appl. No. 14/203,143, Nonfinal Office Action, dated Jul. 7, 2020.
U.S. Appl. No. 14/203,143, Nonfinal Office Action, dated Jun. 3, 2014.
U.S. Appl. No. 14/203,143, Nonfinal Office Action, dated Nov. 27, 2019.
U.S. Appl. No. 14/203,210, Final Office Action, dated Aug. 11, 2015.
U.S. Appl. No. 14/203,210, Final Office Action, dated Aug. 28, 2017.
U.S. Appl. No. 14/203,210, Final Office Action, dated Jul. 9, 2019.
U.S. Appl. No. 14/203,210, Final Office Action, dated Jun. 26, 2018.
U.S. Appl. No. 14/203,210, Final Office Action, dated Nov. 28, 2014.

(56) References Cited

OTHER PUBLICATIONS

U.S. Appl. No. 14/203,210, Final Office Action, dated Oct. 13, 2016.
U.S. Appl. No. 14/203,210, Nonfinal Office Action, dated Apr. 22, 2014.
U.S. Appl. No. 14/203,210, Nonfinal Office Action, dated Aug. 27, 2014.
U.S. Appl. No. 14/203,210, Nonfinal Office Action, dated Feb. 21, 2019.
U.S. Appl. No. 14/203,210, Nonfinal Office Action, dated Feb. 9, 2018.
U.S. Appl. No. 14/203,210, Nonfinal Office Action, dated Jun. 29, 2017.
U.S. Appl. No. 14/203,210, Nonfinal Office Action, dated Mar. 19, 2015.
U.S. Appl. No. 14/203,210, Nonfinal Office Action, dated May 26, 2016.
U.S. Appl. No. 14/203,338, Final Office Action, dated Oct. 6, 2014.
U.S. Appl. No. 14/203,338, Notice of Allowance, dated May 20, 2015.
U.S. Appl. No. 14/203,338, Office Action, dated Feb. 3, 2015.
U.S. Appl. No. 14/203,338, Office Action, dated Jun. 2, 2014.
U.S. Appl. No. 14/203,344, Final Office Action, dated Dec. 22, 2015.
U.S. Appl. No. 14/203,344, Final Office Action, dated Mar. 18, 2015.
U.S. Appl. No. 14/203,344, Nonfinal Office Action, dated Jun. 30, 2015.
U.S. Appl. No. 14/203,344, Nonfinal Office Action, dated Jun. 6, 2014.
U.S. Appl. No. 14/203,344, Nonfinal Office Action, dated Nov. 24, 2014.
U.S. Appl. No. 14/203,344, Nonfinal Office Action, dated Oct. 6, 2016.
U.S. Appl. No. 14/203,344, Notice of Allowance, dated Apr. 7, 2017.
U.S. Appl. No. 14/203,349, Final Office Action, dated Mar. 17, 2015.
U.S. Appl. No. 14/203,349, Final Office Action, dated Dec. 3, 2015.
U.S. Appl. No. 14/203,349, Nonfinal Office Action, dated Feb. 10, 2017.
U.S. Appl. No. 14/203,349, Nonfinal Office Action, dated Jun. 15, 2015.
U.S. Appl. No. 14/203,349, Nonfinal Office Action, dated May 20, 2014.
U.S. Appl. No. 14/203,349, Nonfinal Office Action, dated Oct. 23, 2014.
U.S. Appl. No. 14/203,349, Notice of Allowance, dated Jul. 26, 2017.
U.S. Appl. No. 14/203,356, Final Office Action, dated Apr. 17, 2015.
U.S. Appl. No. 14/203,356, Nonfinal Office Action, dated Jun. 13, 2014.
U.S. Appl. No. 14/203,356, Nonfinal Office Action, dated Sep. 24, 2014.
U.S. Appl. No. 14/203,356, Notice of Allowance, dated Aug. 6, 2015.
U.S. Appl. No. 14/314,822, Final Office Action, dated Apr. 20, 2017.
U.S. Appl. No. 14/314,822, Final Office Action, dated Apr. 22, 2020.
U.S. Appl. No. 14/314,822, Final Office Action, dated Feb. 19, 2021.
U.S. Appl. No. 14/314,822, Final Office Action, dated Mar. 10, 2015.
U.S. Appl. No. 14/314,822, Final Office Action, dated Oct. 8, 2015.
U.S. Appl. No. 14/314,822, Nonfinal Office Action, dated Dec. 10, 2014.
U.S. Appl. No. 14/314,822, Nonfinal Office Action, dated Jan. 12, 2017.
U.S. Appl. No. 14/314,822, Nonfinal Office Action, dated Jan. 2, 2020.
U.S. Appl. No. 14/314,822, Nonfinal Office Action, dated Jul. 7, 2015.
U.S. Appl. No. 14/314,822, Nonfinal Office Action, dated Oct. 29, 2020.
U.S. Appl. No. 14/314,822, Notice of Panel Decision from Pre-Appeal Brief Review, dated Aug. 7, 2017.
U.S. Appl. No. 14/314,822, Patent Trial and Appeal Board Decision, dated Jul. 2, 2019.
U.S. Appl. No. 14/788,998, Final Office Action, dated Apr. 18, 2016.
U.S. Appl. No. 14/788,998, Final Office Action, dated Dec. 21, 2018.
U.S. Appl. No. 14/788,998, Final Office Action, dated Jun. 14, 2017.
U.S. Appl. No. 14/788,998, Nonfinal Office Action, dated Dec. 4, 2015.
U.S. Appl. No. 14/788,998, Nonfinal Office Action, dated Feb. 10, 2017.
U.S. Appl. No. 14/795,369, Final Office Action, dated Apr. 20, 2016.
U.S. Appl. No. 14/795,369, Final Office Action, dated Aug. 22, 2017.
U.S. Appl. No. 14/795,369, Nonfinal Office Action, dated Dec. 8, 2015.
U.S. Appl. No. 14/795,369, Nonfinal Office Action, dated Feb. 7, 2017.
U.S. Appl. No. 14/862,703, Nonfinal Office Action, dated Dec. 10, 2015.
U.S. Appl. No. 14/862,703, Notice of Allowance, dated Apr. 13, 2016.
U.S. Appl. No. 15/210,746, Nonfinal Office Action, dated Oct. 3, 2016.
U.S. Appl. No. 15/210,746, Notice of Allowance, dated Feb. 1, 2017.
U.S. Appl. No. 15/443,936, Nonfinal Office Action, dated Jan. 9, 2018.
U.S. Appl. No. 15/443,936, Nonfinal Office Action, dated May 1, 2018.
U.S. Appl. No. 15/639,016, Nonfinal Office Action, dated Oct. 18, 2018.
U.S. Appl. No. 15/674,067, Notice of Allowance, dated Oct. 13, 2017.
U.S. Appl. No. 15/824,311, Nonfinal Office Action, dated Nov. 2, 2018.
U.S. Appl. No. 15/966,070, Final Office Action, dated Aug. 25, 2021.
U.S. Appl. No. 15/966,070, Final Office Action, dated Oct. 15, 2020.
U.S. Appl. No. 15/966,070, Nonfinal Office Action, dated May 11, 2021.
U.S. Appl. No. 15/966,070, Nonfinal Office Action, dated May 15, 2020.

* cited by examiner

DYNAMIC AUTO INSURANCE POLICY QUOTE CREATION BASED ON TRACKED USER DATA

CROSS-REFERENCE TO RELATED APPLICATIONS

This application is a continuation of U.S. patent application Ser. No. 15/966,070, entitled "Dynamic Auto Insurance Policy Quote Creation Based on Tracked User Data," filed on Apr. 30, 2018 which is a continuation of U.S. patent application Ser. No. 14/795,369 (now U.S. Pat. No. 10,013,719) entitled "Dynamic Auto Insurance Policy Quote Creation Based on Tracked User Data," filed on Jul. 9, 2015 which is a continuation of U.S. patent application Ser. No. 14/203,338 (now U.S. Pat. No. 9,141,996) entitled "Dynamic Auto Insurance Policy Quote Creation Based on Tracked User Data," filed on Mar. 10, 2014, which claims the benefit of U.S. Provisional Application No. 61/775,652, filed Mar. 10, 2013. Each of these applications is herein incorporated in its entirety by reference.

FIELD OF THE DISCLOSURE

This disclosure relates to a system and method for measuring risk to create an insurance policy quote based at least in part on tracked user data and other information.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Auto insurance policy rates may be calculated based on a determined risk for the possibility of a claim against the insurance company under the policy. Determining that risk, however, may be difficult. Typically, insurance companies use a number of factors related to the customer, the property to be insured, and environmental factors (e.g., the geographic area the property is located in and the likelihood of claims in that area). However, accurately determining these factors and, thus, determining an accurate measure of risk for a claim, is difficult because the factors are most often reported to the insurance company by the party most likely to benefit under a claim: the customer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Customers may have urgent needs for short or long term auto insurance policies. Traditional methods of purchasing auto insurance may take too much time to complete, and may not provide the customer with the desired coverage term. A dynamic policy module may provide quick and personalized auto insurance options to a potential customer by accurately and quickly communicating possible risk factors to the insurance provider. Additionally, the module may track usage data of a potential customer to provide more accurate policy quotes, audits, and renewals.

For example, in some embodiments, a computer-implemented method may include, receiving, by one or more processors, a coverage type for the customer vehicle; causing, by the one or more processors, usage data corresponding to the coverage type for the customer vehicle to be tracked; receiving, by the one or more processors, the usage data corresponding to the coverage type for the customer vehicle; generating, by the one or more processors, the one or more new insurance policy quotes corresponding to the coverage type for the customer vehicle based upon at least the usage data corresponding to the coverage type for the customer vehicle; and causing, by the one or more processors, the one or more new insurance policy quotes to be displayed.

In other embodiments, a server may include: one or more processors; and a memory storing instructions that, when executed by the one or more processors, cause the server to: receive a coverage type for the customer vehicle, cause usage data corresponding to the coverage type for the customer vehicle to be tracked, receive the usage data corresponding to the coverage type for the customer vehicle, generate the one or more new insurance policy quotes corresponding to the coverage type for the customer vehicle based upon at least the usage data corresponding to the coverage type for the customer vehicle, and cause the one or more new insurance policy quotes to be displayed.

In still other embodiments, one or more tangible, non-transitory computer-readable media storing executable instructions for creating one or more new insurance policy quotes for a customer associated with a customer vehicle that when executed, cause a computer to: receive a coverage type for the customer vehicle; cause usage data corresponding to the coverage type for the customer vehicle to be tracked; receive the usage data corresponding to the coverage type for the customer vehicle; generate the one or more new insurance policy quotes corresponding to the coverage type for the customer vehicle based upon at least the usage data corresponding to the coverage type for the customer vehicle; and cause the one or more new insurance policy quotes to be displayed.

The features and advantages described in this summary and the following detailed description are not all-inclusive. Many additional features and advantages will be apparent to one of ordinary skill in the art in view of the drawings, specification, and claims hereof.

DETAILED DESCRIPTION

Figure 1:
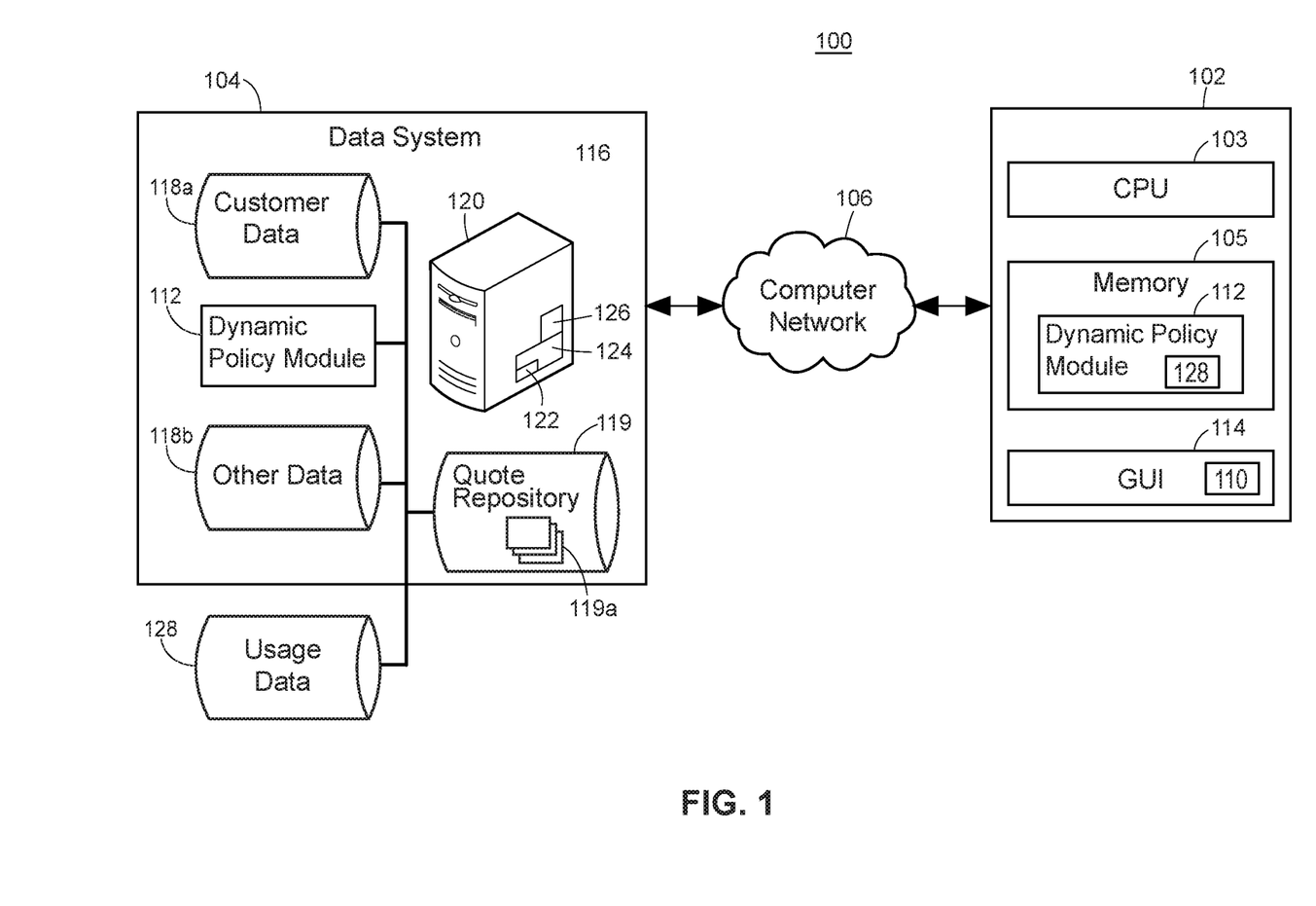
FIG. 1 is a simplified and exemplary block diagram of a system for dynamic insurance policy quote creation based on tracked usage data.

FIG. 1 generally illustrates one embodiment for a system 100 to create and present an auto insurance policy to a potential customer using tracked usage data. The system 100 may include a client 102 as a front end component and backend components 104 in communication with each other via a communication link 106 (e.g., computer network, internet connection, etc.). FIG. 1 illustrates a block diagram of a high-level architecture of dynamic auto insurance policy creation and presentation system 100 including various software or computer-executable instructions and hardware components or modules that may employ the software and instructions to create insurance policies based on tracked usage data. The various modules may be implemented as computer-readable storage memories containing computer-readable instructions (i.e., software) for execution by a processor of the computer system 100. The modules may perform the various tasks associated with creating and presenting auto insurance policies and tracking vehicle usage data, as herein described. The computer system 100 also includes both hardware and software applications, as well as various data communications channels for communicating data between the various hardware and software components.

The client 102 may track vehicle usage data and communicate collected data to the backend components 104 to complete insurance policy creation and presentation. For example, the client 102 may be a computing device including a CPU 103 and one or more computer readable memories 105. The client 102 may be capable of executing a graphical user interface (GUI) 110 for a dynamic policy module 112 within a web browser 114. In some embodiments, the client 102 executes instructions of a network-based data system 116 to receive potential customer data 118a, other data 118b, and usage data 128 via the computer network 106 for display in the GUI 110. The backend components 104 may receive the data 118a, 118b, 128 from the client 102 via the computer network 106 upon execution of a dynamic policy module 112 by a system processor.

The dynamic policy module 112 may create auto insurance quotes 119a and cause the quotes 119a to be stored in a quote data repository 119. Generally, each quote 119a is a data structure defining coverage and conditions for an insurance policy between the insurance company and a potential customer, where the data structure includes a plurality of data to be presented to the user.

The client 102 may be a smart phone, tablet computer, On Board Diagnostic device, key fob device (OBD) or other suitable computing device. While only one client 102 is illustrated in FIG. 1 to simplify and clarify the description, it will be understood that any number of client devices are supported and may be in communication with the backend components 104. Further, while only one CPU 103, Memory 105, and GUI 114 is illustrated in the client 102, the client 102 may support any number of these components.

The client may contain a GUI 110 which may communicate with the system 116 through the Internet 106 or other type of suitable network (local area network (LAN), a metropolitan area network (MAN), a wide area network (WAN), a mobile, a wired or wireless network, a private network, a virtual private network, etc.). A system server 120 may send and receive information and data 118a, 118b, 128 for the system 100 such as computer-executable instructions and data associated with applications executing on the client 102 (e.g., the dynamic policy module 112). The applications executing within the system 100 may include cloud-based applications, web-based interfaces to the data system 116, software applications executing on the client 102, or applications including instructions that are executed and/or stored within any component of the system 100. The applications, GUI 110, browser 114, and module 112 may be stored in various locations including separate repositories and physical locations.

In some embodiments, the data system 116 in general and the server 120 in particular may include computer-executable instructions 122 stored within a memory 124 of the server 120 and executed using a processor 126. The instructions 122 may instantiate a policy creation tool 112 or send instructions to the client 102 to instantiate a GUI 110 for the tool 112 using a web browser application 114 of a client 102. In some embodiments, the browser application 114, GUI 110, dynamic policy module 112, and elements of the data system 116 may be implemented at least partially on the server 120 or the client 102. The data system 116 and processor 126 may execute instructions 122 to display the GUI 110 including the data 118a, 118b, 128 within a display of the client 102 or server 120 (not shown).

The dynamic policy module 112 may include usage data 128 gained through tracking vehicle usage and other information. The dynamic policy module 112 may identify a vehicle based on the Vehicle Identification Number (VIN), stored in the potential customer data 118a. The system 100 may receive the usage data 128 through an on-line environment (e.g., the client 102) and web-based user interface, as further described herein. The system 100 may also receive additional usage data 128 from potential customer data 118a, other data 118b, or historical data 118c when appropriate.

The dynamic policy module 112 may include various instructions for execution by a processor 126 to create policy quotes. For example, the module 112 may create quotes 119a by analyzing the usage data 128 collected by the client 102, along with data from the database 118a, 118b, 128. The module 112 may tailor the policy based on a received coverage type (e.g., selected by a potential customer or automatically when a policy quote 119a is created). Further, the module 112 may track different usage statistics based on the selected coverage type. In one embodiment, the potential customer can choose what usage data to share with the insurance company for purposes of calculating the quote.

The dynamic policy module 112 may then present the one or more created quotes 119a. In response to presenting the one or more created quotes 119a, the module may receive an indication of a policy purchase. Upon receiving a purchased policy from the one or more quotes presented, the module 112 may continue to track usage statistics until the purchased policy expires. At the time of the purchased policy expiration, the module 112 may collect new usage data and create new quotes for the user.

Figure 2:
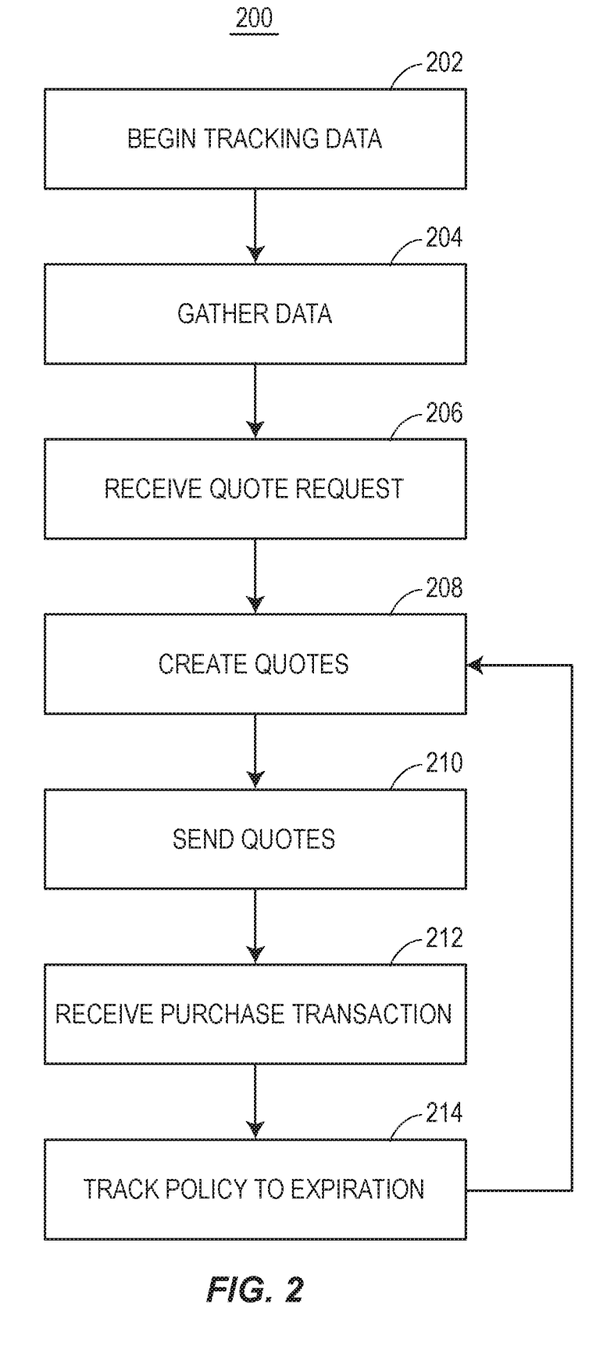
FIG. 2 is a flow chart illustrating an exemplary method for a dynamic insurance policy quote creation based on tracked usage data.

With reference to FIG. 2, the system 100 described herein may be employed in a method 200 to track usage data and create and present insurance quotes to a user. The method 200 may include one or more functions or routines in the form of non-transitory computer-executable instructions that are stored in a tangible computer-readable storage medium and executed using a processor of a computing device (e.g., the client 102, the server 120, or any combination of computing devices within the system 100). The routines may be included as part of any of the modules described in relation to FIG. 1 above, or FIG. 5, below, or as part of a module that is external to the system illustrated by FIGS. 1 and 5. For example, the method 200 may be part of a browser application or another application running on the client 102 as a plugin or other module of the browser application. Further, the method 200 may be employed as "software-as-a-service" to provide a client 102 with access to the data system.

At function 201, the system 100 may execute an instruction to begin tracking usage data, as described above in relation to FIG. 1 (e.g., via a client device 102). The function 201 may include an instruction requiring receipt of data indicating that the user has provided consent before usage data is tracked. In another embodiment, the system receives an indication that an OBD device is installed and activated by the potential customer for tracking to begin. In still another embodiment, the system 100 receives data indicating that a smart phone or other portable computing device is configured to begin tracking usage data.

Figure 3:
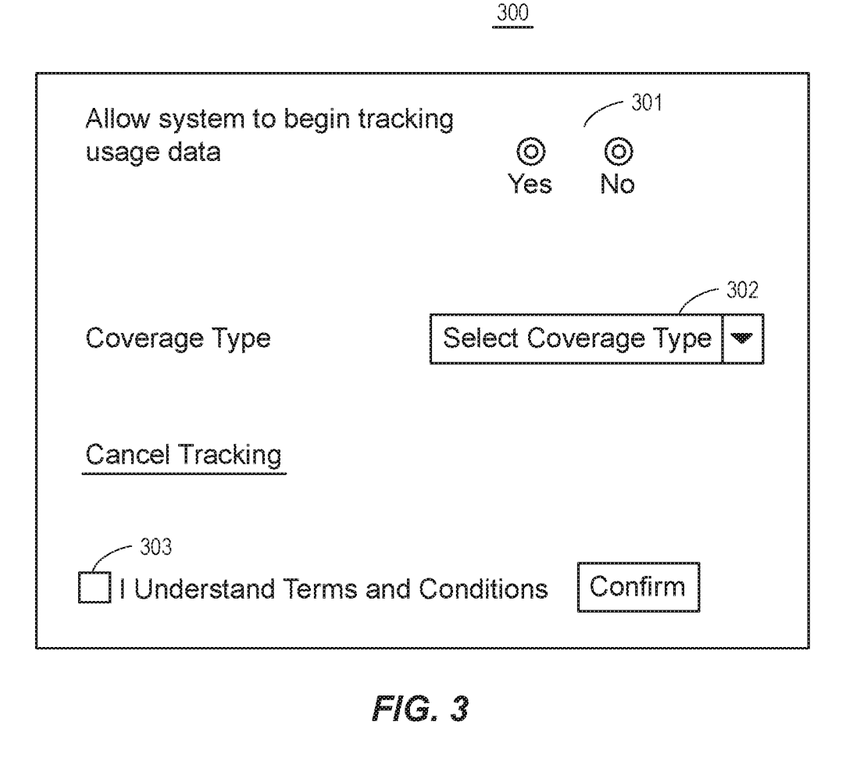
FIG. 3 is an illustration of an example user interface for permitting tracking and selecting a coverage type.

With reference to FIG. 3, an example user interface for permitting tracking 301 and selecting a coverage type 302 may allow the system 100 to receive permission to begin tracking. Further, the example interface 300 may allow the system to receive one or more coverage types. Receiving the coverage type 302 may, in turn, dictate which usage data the dynamic policy module 112 tracks. The interface 300 may also allow the system to receive instructions to stop tracking 303 usage data 128. The interface 300 may be viewed on a client device 102, through a web browser 110 on a GUI 114.

Once the system receives data indicating permission, the module 112, via the client 102, may begin tracking usage data 128 at function 204 of method 200. Referring now the FIG. 1A, a usage database 128 may store a plurality of data structures. In one embodiment, an On Board Diagnostic (OBD) devices may track usage data 128. The OBD device is a computing device installed in the diagnostic port of a vehicle. In an embodiment, one or more OBD devices can be configured to track usage data 128 across one or more vehicles associated with a user. The OBD device may track usage data 128 such as the number of times a vehicle is turned on and off 128A, distance traveled 128B, number of times a person enters or exits the vehicle 128C, total elapsed time the vehicle is on 128D (including drive time and idle time), etc. The OBD device may further be coupled with other sensors, which may enable the OBD device to track the number of times a vehicle enters and exits a particular location 128E, such as a parking garage.

Figure 1A:
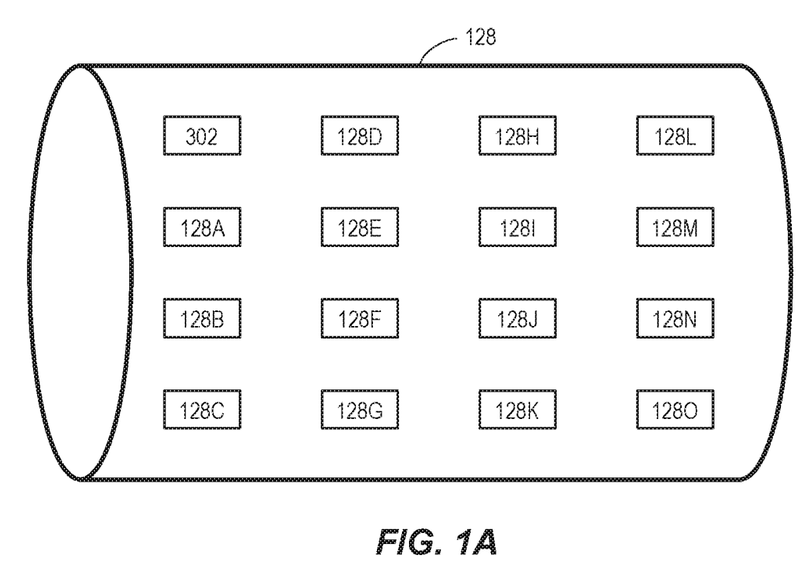
FIG. 1A is an exemplary data structure including usage data.

The OBD device may further track the average speed 128F and the top speed 128G of the vehicle. In an embodiment the OBD device may have access to a Global Positioning System (GPS). The OBD device may then locate the vehicle's location 128H using the GPS which can be used to access local speed limits. The OBD device may then compare the vehicle speed to the local speed limit to determine if the vehicle is being driven in a safe manner 128I. The vehicle location 128H may also be used to track travel routes 128J. The travel routes 128J may be cross referenced with crime stats 128K, accident reports 128L and other statistics which may affect policy quotes 119*a*.

The OBD device may also monitor other factors such as the hours of the day which the vehicle is used 128M, the number of turns a vehicle makes 128N, the average miles per gallon (MPG) the vehicle achieves 128O, and other usage data. Depending on the coverage type, all or a selection of the statistics may be used to determine an insurance policy quote for a user. For example, if a received coverage type 302 is liability insurance, the module 112 may not track average MPG the vehicle achieves 128O, since this data does not directly correlate with the likelihood of an accident.

In another embodiment, the usage data 128 may be tracked by a smart phone or other mobile computing device such as a GPS or tablet computer. The device may be configured to communicate with sensors in a vehicle by a wired or wireless (e.g., Bluetooth) connection. Once the device communicates with a sensor, the device may determine when to begin tracking usage data 128. The device may also be able to receive data from the vehicle such as odometer readings 128B, travel times (128D, 128M), speed (128F, 128G) and mileage statistics (128O), and other data. The device may be able to track usage data 128 as described above with regard to the OBD device. In further embodiments, the dynamic policy module 112 executing on a smart phone or other mobile computing device may prompt a user to photograph the odometer of the vehicle. For example, the module 112 may execute an instruction to prompt the user at periodic intervals to take a photo of the odometer and the module may further execute an instruction to send the photo to the server 102 for analysis or may analyze the photo at the mobile computing device to determine a set of numbers from the photo, where the numbers indicate a mileage of the vehicle.

Each data structure of the tracked usage data 128 may influence the policy quotes 119*a*. For example, the total elapsed time the vehicle is on 128D may directly affect the quote. Generally, users with vehicles that operate for less time generally pay a lower amount for auto insurance, all other factors being equal. In one implementation, an in-vehicle mounted device such as Auterra's DashDyno SPD may be used to collect data on total elapsed time the vehicle was in use 128D. DashDyno connects to the vehicle's OBD system and may be used to collect data on different vehicle parameters including drive time (i.e., engine running time) and time since engine start. A "publish and subscribe" protocol of the dynamic policy module 112 may be used to automatically download the data from the localized sensor device to the mobile device for transmitting vehicle usage data to the server 120. In another implementation, the localized sensor device may be installed in the user's vehicle after the insurance purchase transaction. For example, the device would be mailed to the potential customer along with policy details.

Further, the vehicle may be determined to be in use 128D by a vibration sensor. In an embodiment, a vibration sensor may detect the motion of the vehicle, and thus determine that the vehicle is in use. In another embodiment, a light sensor may be used to determine that a vehicle is in use 128D. A light sensor may detect changes in light patterns as the vehicle is in motion. In still another embodiment, an audio sensor may be used to determine that the vehicle is in use. An audio sensor may detect engine sounds to determine that a vehicle is in use. These sensors (vibration, light, and sound) may then record and transmit data on the length of time a vehicle is in use 128D.

In another implementation, the number of turns a vehicle makes 128N may affect the quote 119*a*. In an example, turns 128N may be counted by the number of times a steering wheel is turned past a minimum threshold of X degrees. The number of turns 128N may, for example, be monitored using a proximity sensor and a wheel covering. Further, the sensor may be decoupled from a communication device. In another example, the sensor may be coupled to a communication device.

Similarly, the number of times a user enters and exits the vehicle 128C may affect the quote 119a. The number of times a user enters and exits the vehicle 128C may be tracked, in one example, by the user's key fob for the vehicle. The key fob may include a sensor that counts the number of times a user enters, exits, and/or starts the vehicle. The key fob may also include a time-of day sensor to "timestamp" the time of day the vehicle is used 128M.

The number of times a vehicle enters or exits a particular location 128E, such as a garage, may affect the quote 119a. In one example, a sensor positioned in proximity to a vehicle parking place such as a garage door, near a reserved parking spot, or at the threshold of a driveway may be used to count the number of times the vehicle is moved from the location 128E. In one implementation the sensor may be decoupled from a communication device, while in another implementation the sensor may be coupled to a communication device. The sensor may a device such as a magnetic sensor, an electric sensor, a light sensor, an infrared sensor, etc.

Further, distance traveled 128B may affect the quote 119a. Distance traveled 119a may be tracked using GPS technology. In another embodiment, distance traveled 128B may be tracked using off-premises field surveying of a vehicle. In still another embodiment, distance travelled 128B may be tracked using a plurality of sensor devices distributed within a geographical area. In still another embodiment, distance travelled 128B may be tracked using aerial imagery of the vehicle.

The dynamic policy module 112, via the client 102, may continue to track usage data 128 until tracking is cancelled or until a quote request is received at the server at function 206. The dynamic policy module 112 may then determine a risk score for the potential customer and correlate that determined score to a price for an insurance policy based on the coverage type received by function 202, or for a new coverage type received along with the quote request.

The module 112 may be able to create quotes for auto insurance policies of many different coverage types. For example, a module 112 may create quotes for auto insurance policies with variable time lengths. These policies may be based on the needs of a user and can last a duration of hours, days, weeks or months. In another implementation, a coverage type may be based on a distance. The policy may be based on a user's needs and cover both short and long distances.

At function 208, the dynamic policy module 112 may create an auto insurance quote using the gathered data of function 204. The module 112 may receive usage data 128, potential customer data 118a, other data 118b, and historical data 118c. The module 112 may then calculate, using the received data, one or more auto insurance quotes based on the received coverage type. Each policy 119a, created by the module 112, may be stored in the policy data repository 119 before being communicated to the client device 102 via the network 106 and presented within a user interface.

At function 210, the system may execute instructions to send the created quotes 119a to be presented. The system may execute an instruction to have the dynamic policy module 112 send data including one or more quotes 119a and present the quotes 119a in a GUI 110 on a web browser 114 to a potential customer using a client 102 via communication link 106 (e.g., user interface 400 of FIG. 4). In some embodiments the interface 400 may include one or more presented quotes 119a. The presented quotes 119a may also include various information about the policy, such as duration (distance or time) 401, cost 402, deductible 403, reasons for the value price quote based on the gathered data 404, etc.

Figure 4:
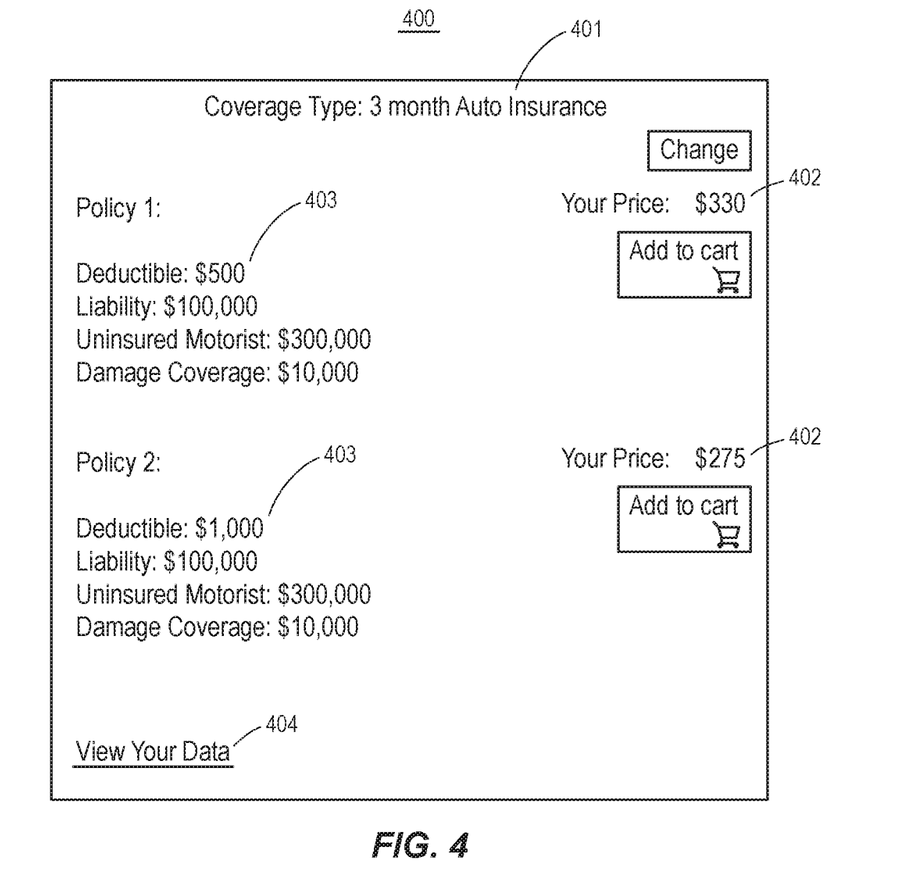
FIG. 4 is an illustration of an example user interface for displaying quotes.

At function 212, the system 100 may execute instructions to receive a purchase transaction, via interface 400. Upon receiving a purchase transaction, the dynamic policy module 112 may execute instructions to begin tracking usage data to determine when the purchased policy expires, at function 214. The module 112 may determine that a policy has expired once a certain amount of time has passed since the purchase transaction. In another implementation, the module 112 may determine that a policy has expired based on the number of miles driven since the purchase transaction.

Once the module 112 determines that the policy has expired, the module may create new quotes 119a to present to a user for purchase. The module 112 would receive new usage data 128, tracked since the last purchase transaction, and use the information to create new quotes 119a.

Figure 5:
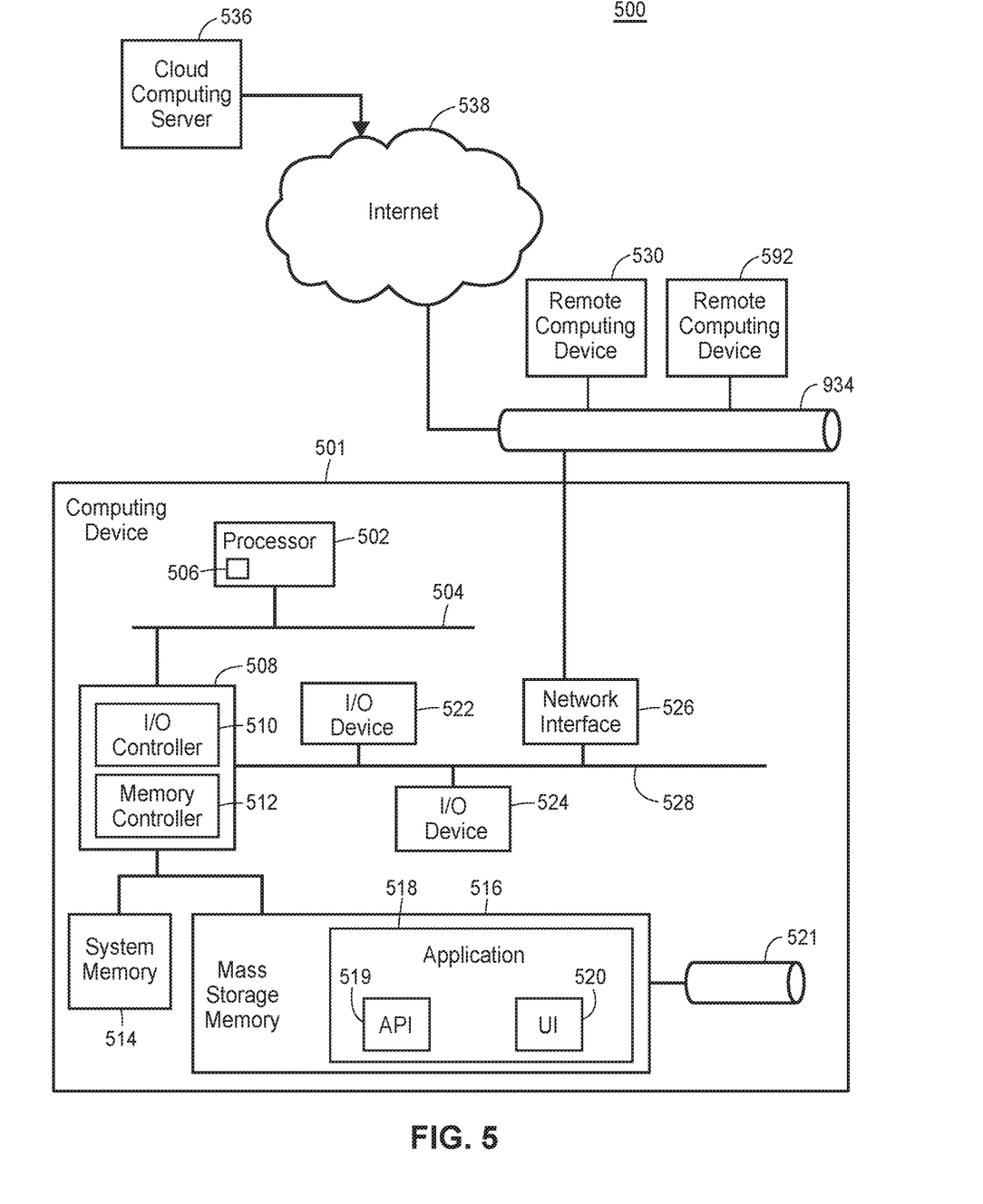
FIG. 5 illustrates a block diagram of a computer to implement the various user interfaces, methods, functions, etc., for dynamic auto insurance policy creation based on tracked usage data in accordance with the described embodiments.

FIG. 5 illustrates an exemplary computing environment for implementing the system 100 and method 200, as described herein. As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 512 and a peripheral input/output (I/O) controller 510. As is well known, a chipset typically provides I/O and memory management functions as well as a plurality of general purpose and/or special purpose registers, timers, etc. that are accessible or used by one or more processors coupled to the chipset 508. The memory controller 512 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a bundle tool application 518 having an API 519 (including functions and instructions as described by the method 300 of FIG. 3), and user interface 110 to receive user input, the mass storage memory 516 may include a hard disk drive, an optical drive, a tape storage device, a solid-state memory (a flash memory, a RAM memory, etc.), a magnetic memory (e.g., a hard drive), or any other memory suitable for mass storage. In one embodiment, non-transitory program functions, modules and routines (an application 518, an API 519, and the user interface 110, etc.) are stored in mass storage memory 516, loaded into system memory 514, and executed by a processor 502 or can be provided from computer program products that are stored in tangible computer-readable storage mediums (RAM, hard disk, optical/magnetic media, etc.). Mass storage 516 may also include a cache memory 521 storing application data, user profile data, and timestamp data corresponding to the application data, and other data for use by the application 518.

The peripheral I/O controller 510 performs functions that enable the processor 502 to communicate with peripheral input/output (I/O) devices 522 and 524, a network interface 526, via a peripheral I/O bus 528. The I/O devices 522 and 524 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 522 and 524 may be used with the application 518 to provide a dynamic policy module 112 and web interface 400 as described in relation to the figures. The local network transceiver 528 may include support for Wi-Fi network, Bluetooth, Infrared, cellular, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 526 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The system 500 may also implement the user interfaces 300 and 400 and dynamic policy module 112 on remote computing devices 530 and 532. The remote computing devices 530 and 532 may communicate with the computing device 501 over a network link 534. For example, the computing device 501 may receive usage data 128 tracked by an application executing on a remote computing device 530, 532. In some embodiments, the application 518 including the user interfaces 300 and 400 and module 112 may be retrieved by the computing device 501 from a cloud computing server 536 via the Internet 538. When using the cloud computing server 536, the retrieved application 518 may be programmatically linked with the computing device 501. The dynamic policy module application 518 may be a Java® applet executing within a Java® Virtual Machine (JVM) environment resident in the computing device 501 or the remote computing devices 530, 532. The application 518 may also be "plug-ins" adapted to execute in a web-browser located on the computing devices 501, 530, and 532. In some embodiments, the application 518 may communicate with backend components 540 such as the data system 104 via the Internet 538 or other type of network.

Using the system 100 and method 200 described herein, a dynamic policy module 112 and interfaces 300 and 400 coupled with the method 200 may implement a dynamic insurance creation methodology to better service, retain, and expand a business' potential customer base. By implementing the dynamic creation policies by the module 112, potential customers may have access to auto insurance coverage that is simple and quick. In an insurance business, this instant creation of policies may help cater to the needs of potential customers while also providing a new avenue for sales. For example, a potential customer in need of auto insurance coverage for a 50 mile trip may get a quote and purchase the coverage in minutes.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 112, may include but is not limited to any combination of a LAN, a MAN, a WAN, a mobile, a wired or wireless network, a private network, or a virtual private network. Moreover, while only one client computing device is illustrated in FIG. 1 to simplify and clarify the description, it is understood that any number of client computers or display devices are supported and can be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for creating and presenting insurance bundles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for creating one or more new insurance policy quotes for a customer associated with a customer vehicle, the method comprising:
    receiving, by a first software application executing on a computing device, by one or more processors, a coverage type, of a plurality of coverage types, for the customer vehicle;
    causing, by the first software application executing on the computing device, by the one or more processors, a second software application executing on a mobile computing device in conjunction with one or more sensors to track a particular type of usage data of the customer vehicle based on the received coverage type for the customer vehicle, wherein a first type of usage data is tracked for a first coverage type and a second type of usage data is tracked for a second coverage type, the first type of usage data being distinct from the second type of usage data;
    receiving, by the first software application executing on the computing device, by the one or more processors from the second software application executing on the mobile computing device, the particular type of usage data;
    generating, by the first software application executing on the computing device, by the one or more processors, the one or more new insurance policy quotes corresponding to the coverage type for the customer vehicle based upon at least the particular type of usage data; and
    transmitting, by the first software application executing on the computing device, by the one or more processors to the second software application executing on the mobile computing device, the one or more new insurance policy quotes to cause the second software application executing on the mobile computing device to display the one or more new insurance policy quotes in a user interface of the mobile computing device.

2. The computer-implemented method of claim 1, further comprising:
    causing, by the first software application executing on the computing device, by the one or more processors, a prompt to be displayed on the software application executing on the mobile computing device of the customer, the prompt to input the coverage type for the customer vehicle.

3. The computer-implemented method of claim 2, wherein the prompt to input the coverage type for the customer vehicle includes, as selectable options, (i) personal vehicle insurance and (ii) commercial vehicle insurance.

4. The computer-implemented method of claim 1, wherein causing the particular type of usage data corresponding to the coverage type for the customer vehicle to be tracked includes:
    transmitting, by the first software application executing on the computing device, by the one or more processors, to the second software application executing on the mobile computing device of the customer, an indication for the second software application executing on the mobile computing device to track the particular type of usage data corresponding to the coverage type for the customer vehicle.

5. The computer-implemented method of claim 1, wherein the particular type of usage data is used to determine one or more of: a number of times the customer enters or exits the customer vehicle, a total idle time for the customer vehicle, a total driving time for the customer vehicle, a number of times the customer vehicle enters and exits a particular location, a frequency of driving events, a severity of driving events, an average miles per gallon the customer vehicle achieves, a carbon footprint the customer vehicle achieves, a location of the customer vehicle, a number or percent of times the customer vehicle surpasses a speed limit, a crime statistic along a travel route, a weather event along the travel route, or an accident report along the travel route.

6. The computer-implemented method of claim 1, wherein at least one of:
    (i) the coverage type is based on one or more distance thresholds to be traveled by the customer vehicle and the particular type of usage data is used to determine one or more actual distances traveled by the customer vehicle, or (ii) the coverage type is based on one or more amount of time thresholds in which the customer vehicle is to be driven and the particular type of usage data is used to determine one or more actual amounts of time in which the customer vehicle is driven.

7. The computer-implemented method of claim 1, wherein the coverage type corresponds to liability insurance.

8. The computer-implemented method of claim 1, further comprising:
sending, by the first software application executing on the computing device, by the one or more processors, a prompt to the second software application executing on the mobile computing device of the customer, the prompt to take a photo of an odometer of the customer vehicle; and
analyzing, by the first software application executing on the computing device, by the one or more processors, the photo at one or more of the second software application executing on the mobile computing device or a backend server to determine a set of numbers from the photo,
wherein the set of numbers indicates a mileage of the customer vehicle.

9. The computer-implemented method of claim 1, further comprising:
receiving, by the first software application executing on the computing device, by the one or more processors, an indication of permission to begin tracking the particular type of usage data corresponding to the coverage type for the customer vehicle.

10. The computer-implemented method of claim 1, further comprising:
receiving, by the first software application executing on the computing device, by the one or more processors, a purchase transaction of a calculated insurance policy quote from the customer.

11. A server comprising: one or more processors; and a memory storing a first software application including instructions that, when executed by the one or more processors, cause the server to:
receive a coverage type, of a plurality of coverage types, for a customer vehicle;
cause a second software application executing on a mobile computing device in conjunction with one or more sensors to track a particular type of usage data of the customer vehicle based on the received coverage type for the customer vehicle, wherein a first type of usage data is tracked for a first coverage type and a second type of usage data is tracked for a second coverage type, the first type of usage data being distinct from the second type of usage data;
receive, from the second software application executing on the mobile computing device, the particular type of usage data;
generate one or more new insurance policy quotes for a customer associated with the customer vehicle corresponding to the coverage type for the customer vehicle based upon at least the particular type of usage data; and
transmitting, to the second software application executing on the mobile computing device, the one or more new insurance policy quotes to cause the second software application executing on the mobile computing device to display the one or more new insurance policy quotes in a user interface of the mobile computing device.

12. The server of claim 11, the memory storing further instructions that, when executed by the one or more processors, cause the server to:
cause a prompt to be displayed on the second software application executing on the mobile computing device of the customer, the prompt to input the coverage type for the customer vehicle.

13. The server of claim 12, wherein the prompt to input the coverage type for the customer vehicle includes, as selectable options, (i) personal vehicle insurance and (ii) commercial vehicle insurance.

14. The server of claim 11, wherein the instructions stored in the memory that, when executed by the one or more processors, cause the server to:
transmit to the second software application executing on the mobile computing device of the customer, an indication for the second software application executing on the mobile computing device to track the particular type of usage data.

15. The server of claim 11, wherein the particular type of usage data is used to determine one or more of: a number of times the customer enters or exits the customer vehicle, a total idle time for the customer vehicle, a total driving time for the customer vehicle, a number of times the customer vehicle enters and exits a particular location, a frequency of driving events, a severity of driving events, an average miles per gallon the customer vehicle achieves, a carbon footprint the customer vehicle achieves, a location of the customer vehicle, a number or percent of times the customer vehicle surpasses a speed limit, a crime statistic along a travel route, a weather event along the travel route, or an accident report along the travel route.

16. The server of claim 11, wherein at least one of:
(i) the coverage type is based on one or more distance thresholds to be traveled by the customer vehicle and the particular type of usage data is used to determine one or more actual distances traveled by the customer vehicle, or
(ii) the coverage type is based on one or more amount of time thresholds in which the customer vehicle is to be driven and the particular type of usage data is used to determine one or more actual amounts of time in which the customer vehicle is driven.

17. The server of claim 11, wherein the coverage type corresponds to liability insurance.

18. One or more tangible, non-transitory computer-readable media storing a first software application including executable instructions for creating one or more new insurance policy quotes for a customer associated with a customer vehicle that when executed, cause a computer to:
receive a coverage type, of a plurality of coverage types, for the customer vehicle;
cause a second software application executing on a mobile computing device in conjunction with one or more sensors to track a particular type of usage data of the customer vehicle based on the received coverage type for the customer vehicle, wherein a first type of usage data is tracked for a first coverage type and a second type of usage data is tracked for a second coverage type, the first type of usage data being distinct from the second type of usage data;
receive the particular type of usage data from the second software application executing on the mobile computing device;

generate the one or more new insurance policy quotes corresponding to the coverage type for the customer vehicle based upon at least the particular type of usage data; and transmit, to the second software application executing on the mobile computing device, the one or more new insurance policy quotes to cause the second software application executing on the mobile computing device to display the one or more new insurance policy quotes in a user interface of the mobile computing device.

19. The one or more tangible, non-transitory computer-readable medium of claim 18 storing further executable instructions that when executed, cause a computer to:

cause a prompt to be displayed on the second software application executing on the mobile computing device of the customer, the prompt to input the coverage type for the customer vehicle.

20. The one or more tangible, non-transitory computer-readable medium of claim 19 wherein the prompt to input the coverage type for the customer vehicle includes, as selectable options, (i) personal vehicle insurance and (ii) commercial vehicle insurance.

\* \* \* \* \*